United States Patent
Goldstone (10) Patent No.: US 10,269,013 B2
(45) Date of Patent: Apr. 23, 2019

(54) REGISTRATION METHOD AND SYSTEM FOR SECURE ONLINE BANKING

(71) Applicant: Barclays Bank PLC, London (GB)

(72) Inventor: Jeremy Goldstone, Greater Manchester (GB)

(73) Assignee: BARCLAYS SERVICES LIMITED, London (GB)

( * ) Notice: Subject to any disclaimer, the term of this patent is extended or adjusted under 35 U.S.C. 154(b) by 718 days.

(21) Appl. No.: 14/426,500

(22) PCT Filed: Sep. 6, 2013

(86) PCT No.: PCT/GB2013/052336
§ 371 (c)(1),
(2) Date: Mar. 6, 2015

(87) PCT Pub. No.: WO2014/041336
PCT Pub. Date: Mar. 20, 2014

(65) Prior Publication Data
US 2015/0242852 A1 Aug. 27, 2015

(30) Foreign Application Priority Data
Sep. 11, 2012 (GB) .................. 1216147.7

(51) Int. Cl.
G06Q 40/00 (2012.01)
G06Q 20/40 (2012.01)
G06Q 20/10 (2012.01)
G06Q 20/12 (2012.01)
(Continued)

(52) U.S. Cl.
CPC ............ *G06Q 20/40* (2013.01); *G06Q 20/02* (2013.01); *G06Q 20/10* (2013.01); *G06Q 20/12* (2013.01);
(Continued)

(58) Field of Classification Search
CPC .................................. G06Q 30/0601
(Continued)

(56) References Cited

U.S. PATENT DOCUMENTS

2004/0034568 A1* 2/2004 Sone ............... G06Q 30/06
705/26.81
2004/0111367 A1 6/2004 Gallagher et al.
(Continued)

FOREIGN PATENT DOCUMENTS

DE 102 18 210 A1 11/2003
EP 2 495 677 A1 3/2010
(Continued)

OTHER PUBLICATIONS

The above US and foreign patent documents 1, 3, and 4 were cited in a British Search Report dated Dec. 19, 2012, that issued in the corresponding British Patent Application No. 12 16 147.7.
(Continued)

*Primary Examiner* — Jamara Franklin
(74) *Attorney, Agent, or Firm* — Foley & Lardner LLP (57) ABSTRACT

In an exemplary embodiment, a method of registering online payment transaction details in an online banking system is described, the method comprising receiving data associated with an online payment transaction from a user, and storing data defining the online payment transaction after verifying the user's identity. In an initial mode of operation, the system enforces a restriction on the online transaction, and in a subsequent mode of operation, the system removes the restriction. A two-stage method of registering a user for access to an application on a mobile handset is also provided, whereby access is initially restricted until subsequent re-authentication of the user using a different channel.

18 Claims, 4 Drawing Sheets

(51) Int. Cl.
*G06Q 20/32* (2012.01)
*G06Q 20/38* (2012.01)
*G06Q 20/02* (2012.01)

(52) U.S. Cl.
CPC ........... *G06Q 20/32* (2013.01); *G06Q 20/322* (2013.01); *G06Q 20/385* (2013.01); *G06Q 20/401* (2013.01); *G06Q 20/405* (2013.01)

(58) Field of Classification Search
USPC ......... 235/375, 379, 380; 705/26.81, 35, 37, 705/26.1, 39
See application file for complete search history.

(56) References Cited

U.S. PATENT DOCUMENTS

2011/0184840 A1    7/2011    Godard et al.
2016/0189154 A1*    6/2016    Eramian .............. G06Q 20/405 705/44

FOREIGN PATENT DOCUMENTS

GB    2 351 594 A    1/2001
JP    2006-259854 A    9/2006
KR    10-0946410 B1    3/2010

OTHER PUBLICATIONS

The above foreign patent documents 2 and 5 were cited in a British Search Report dated Aug. 6, 2013, that issued in the corresponding British Patent Application No. 12 16 147.7.
International Preliminary Report on Patentability in International Application No. PCT/GB2013/052336 dated Mar. 17, 2015 (7 pages).
International Search Report and Written Opinion in International Application No. PCT/GB2013/052336 dated Nov. 20, 2013 (8 pages).

* cited by examiner

REGISTRATION METHOD AND SYSTEM FOR SECURE ONLINE BANKING

FIELD OF THE INVENTION

This invention relates to an online financial transaction system, and more particularly to a method and system to enable efficient registration for and control of access to functionality provided by the system.

BACKGROUND OF THE INVENTION

Online financial transaction systems, such as online banking and investment systems are generally known, in which a customer is able to log on to an online banking website via a web browser on a computer or smart phone, to perform various functions such as retrieving account balances, transferring funds between the customer's bank or credit card accounts, setting up third party payees to receive payment of funds from a customer's bank account, instructing payment of funds to from a customer's bank account to a third party, and purchasing of stocks and shares.

Conventional online banking systems typically require layers of security to ensure that access to customer banking details is restricted to authorised users. For example, a typical log on process will involve the customer entering identification details such as a username or account number together with an associated passcode and/or memorable word, or requested portions thereof. The online banking system verifies the customer identification details before authorising access to the online banking functions. Another layer of security typically provided is to verify a unique and time sensitive one-time passcode that is generated by the customer using a hardware token or passcode generator software, as is known in the art.

What is desired is an improved online financial transaction system that facilitates more flexible and efficient functionality while maintaining security and assurance throughout.

STATEMENTS OF THE INVENTION

Aspects of the present invention are set out in the accompanying claims.

According to one aspect of the present invention, a method is provided of registering transaction details in an online financial transaction system, the method comprising receiving data associated with an online transaction from a user, and storing data defining the online transaction after verifying the user's identity. In an initial mode of operation, the system enforces a restriction on the online transaction by the user, and in a subsequent mode of operation, the system removes the restriction.

In another aspect, the present invention provides a method of registering a user for mobile authentication in an online financial transaction system, comprising authenticating a user of a mobile device by verifying a first registration code entered by the user to the mobile device, and storing data indicative of a restriction on online transactions by the user, and re-authenticating the user of the mobile device by verifying a second registration code entered by the user to the mobile device, and removing the restrictions on online transactions by the user.

In yet another aspect, the present invention provides a method of registering a user for access to functionality provided by an application on a mobile device, comprising authenticating a user of the mobile device by verifying a first registration code entered by the user to the mobile device, and storing data indicative of a restriction on functionality accessible by the user, re-authenticating the user of the mobile device by verifying a second registration code entered by the user to the mobile device, and removing the restriction on functionality accessible by the user.

In other aspects, there are provided systems arranged to execute any one of the above methods.

In another aspect, there is provided a computer program arranged to carry out the method when executed by suitable programmable devices.

BRIEF DESCRIPTION OF THE DRAWINGS

There now follows, by way of example only, a detailed description of embodiments of the present invention, with references to the figures identified below.

FIG. 2, which comprises

DETAILED DESCRIPTION OF EMBODIMENTS OF THE INVENTION

Overview

Figure 1:
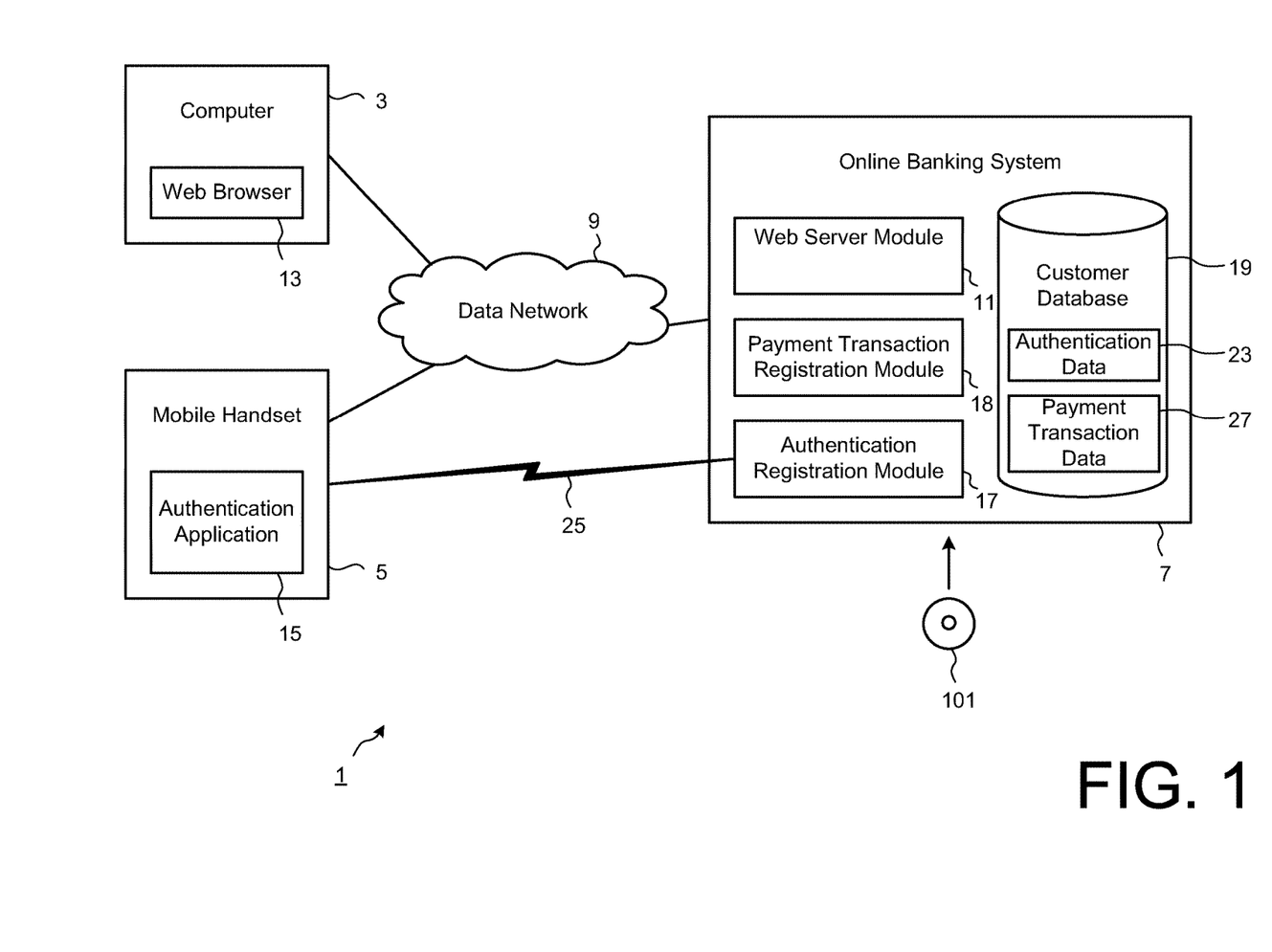
FIG. 1 is a block diagram showing the main components of an online banking environment according to an embodiment of the invention.

A specific embodiment of the invention will now be described for a process of registering a transaction instruction using a two-stage customer authentication in an exemplary online banking environment. Referring to FIG. 1, the exemplary online banking environment 1 includes a computer 3 and a mobile handset 5 associated with the customer wishing to log-on to an online banking system 7 of his/her financial institution via a data network 9, for example to set up a new online transaction. The online transaction may be one of many different forms of financial transaction, such as a payment transaction for an identified value of funds to be transferred from the customer's account to another account, or an order to purchase an identified number or value of shares, etc. A web server 11 in the online banking system 7 provides an online banking interface for the customer, for example via a web browser 13 on the customer's computer 3.

As will be described in detail below, an authentication application 15 in the mobile handset 5 communicates data with an authentication registration module 17 in the online banking system 7 to verify the customer during the registration process. A payment transaction module 18 in the online banking system 7 facilitates registration of payment transaction details after verification of the customer. The online banking system 7 stores customer data in a database 19, including payment transaction data 21 identifying details of payment transactions registered by the customer using the online banking system 7, and authentication data 23 identifying whether or not the customer is registered for authentication via a mobile device as well as any restrictions that are in place for online transactions registered by the customer. The customer data also includes a mobile device number (MDN) associated with the customer and the mobile handset 5, typically provided when the customer's financial account was initially set up.

Additional modules may be provided in the online banking system 7 to facilitate payment transactions to and from the customer's financial accounts via the associated financial institution back-end systems (not shown), as well as other types of functionality that are known per se in such systems and need not be described further.

The computer 3 may be any form of computing device or platform suitable to execute web browser software, such as a personal desktop or laptop computer, a personal data assistant (PDA), a smart phone, a tablet device, or the like. The data network 9 may be any suitable data communication network or combination of known networks, such as a wireless network, a local- or wide-area network including an intranet or the Internet, using for example the TCP/IP protocol, or a cellular communication network such as GPRS, EDGE or 3G, for example. Such communication protocols are of a type that are known per se in data networks and need not be described further. Electronic data communication by the computer 3, mobile handset 5 and online banking system can be encrypted.

The mobile handset 5 can be a mobile smartphone, tablet computer or portable computing device with cellular data communication capabilities, for receiving Short Message Service (SMS) messages from the online banking system 7 over a cellular network communication path 25, and network data communication capabilities for communicating with the online banking system 7 via the data network 9. It will be appreciated that in some network configurations, the mobile network communication path 17 will be through the data network 7.

Registration Process

A brief description has been given above of the components forming part of the online banking environment 1 of this exemplary embodiment. A more detailed description of the operation of these components in this embodiment will now be given with reference to the flow diagrams of FIG. 2, for an example computer-implemented registration process using the computer 3 and mobile handset 5 in data communication with the online banking system 7.

Figure 2A:
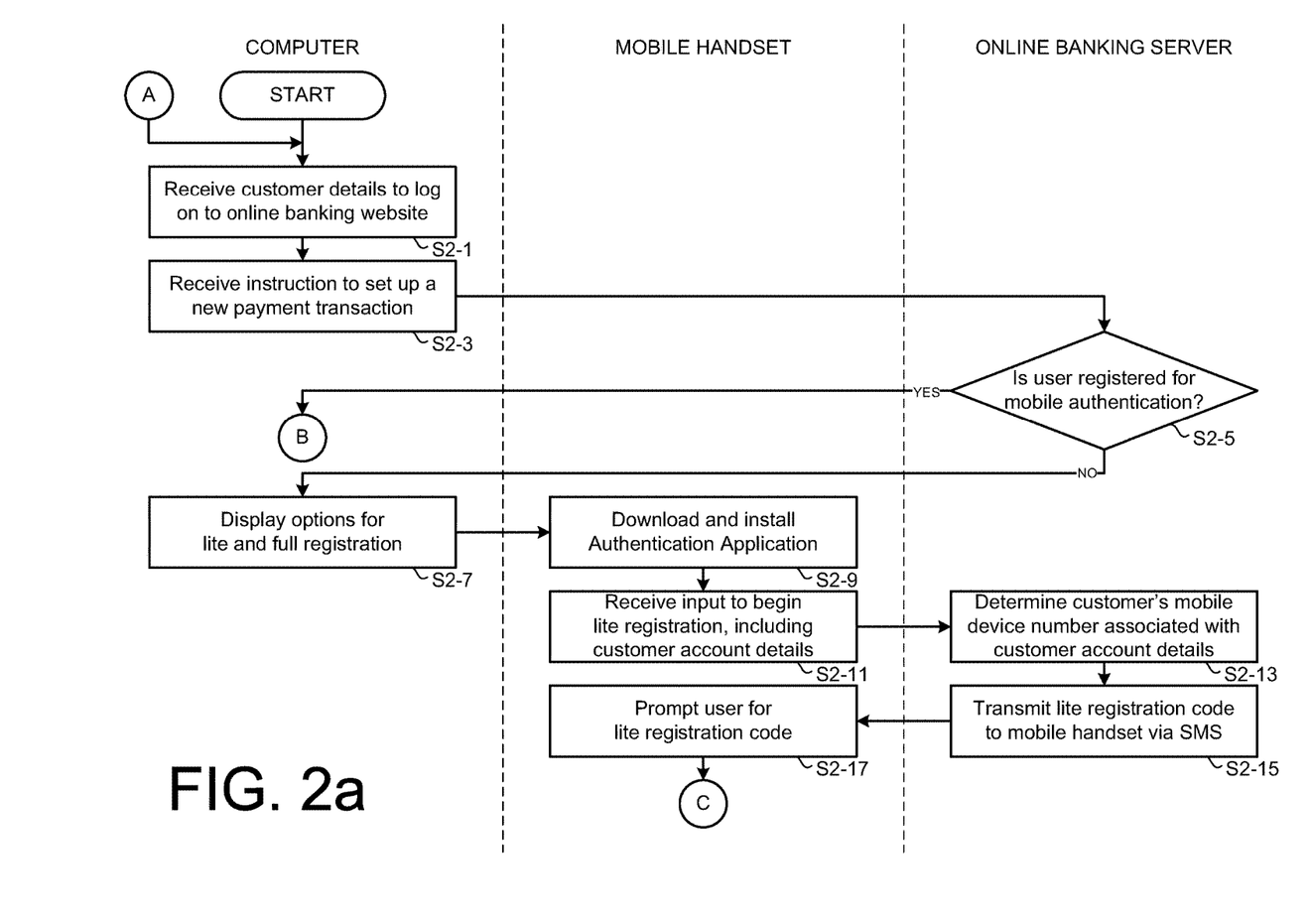
FIGS. 2a to 2c, is a flow diagram illustrating the main processing steps performed by components of the system of FIG. 1 according to an embodiment.
Figure 2B:
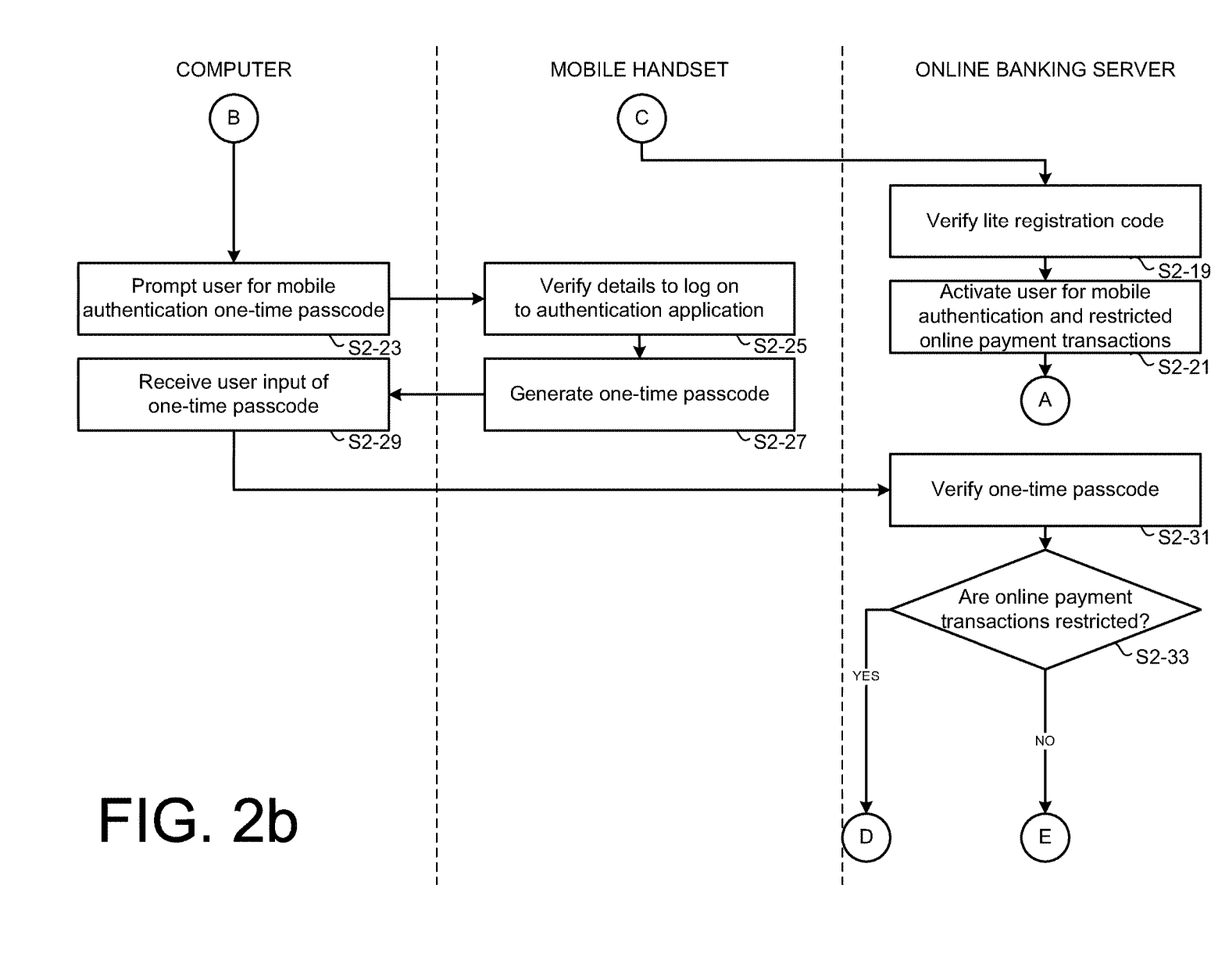
Figure 2C:
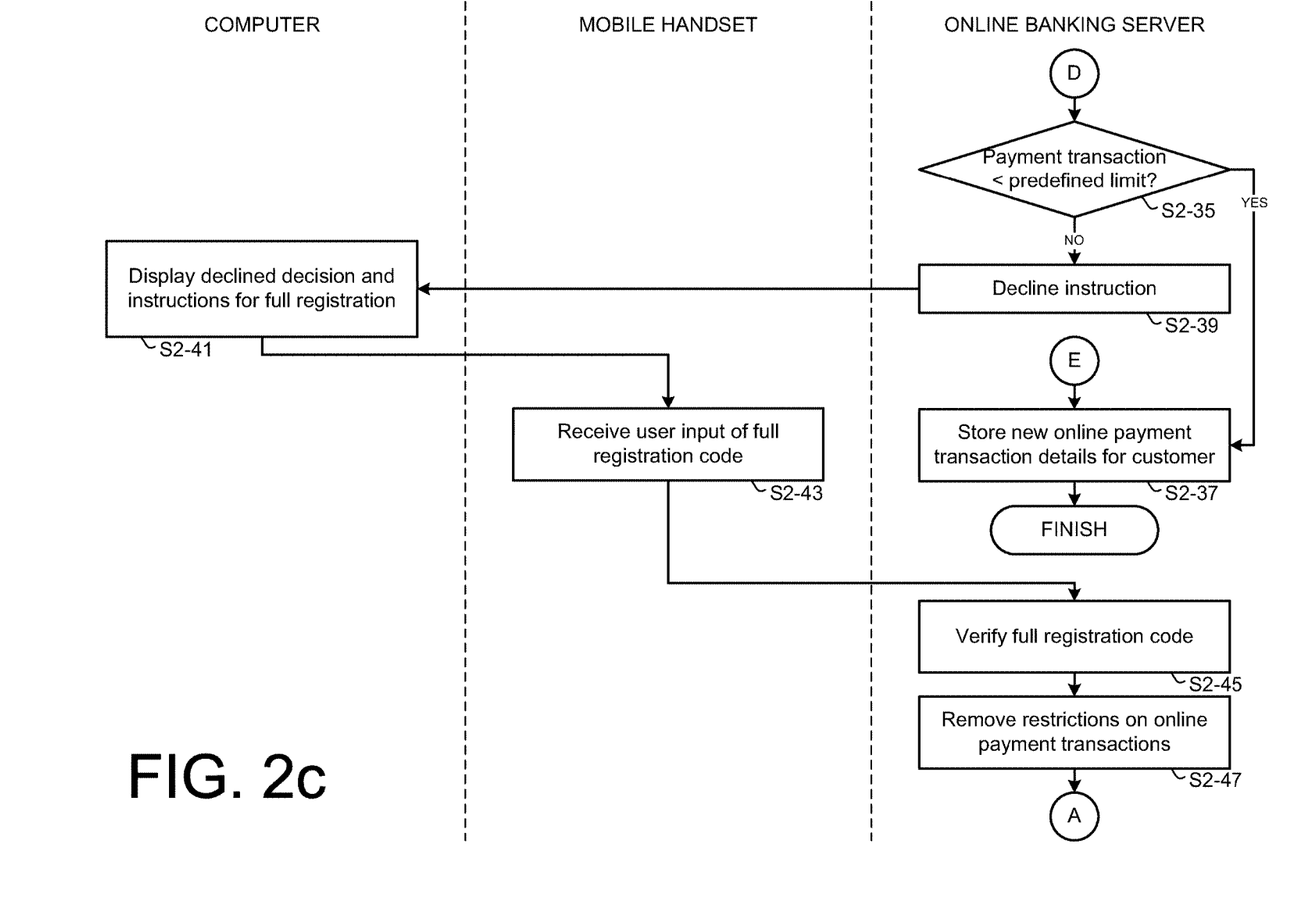

As shown in FIG. 2, the process begins at step S2-1 where the computer 3 receives user input, via the web browser, of customer details to log on to the online banking website hosted by the web server 11. Typically, the log on process involves the customer entering identification details such as a username or account number together with an associated passcode and/or memorable word, or requested portions thereof. The online banking system verifies the customer's identification details before authorising access to online banking functions via the online banking interface. At step S2-3, the computer 3 receives user input selection of an option to set up a new payment transaction. A similar registration process is carried out for an instruction to set up a new third party payee for future online payment transactions.

In response to receiving the instruction to set up a new payment transaction, the online banking server 7 determines at step S2-5 if the customer is registered for authentication using an associated mobile handset. As will be described later, the authentication data 23 stored in the customer database 19 is updated as the customer proceeds with the two-stage mobile authentication. Accordingly, if the online banking server 7 determines from the stored authentication data 23 that the customer is not registered for mobile authentication, then at step S2-7, the online banking website on the computer 3 displays a notification to the user that registration for mobile authentication is required, and providing instructions for the customer to proceed with the two-stage mobile authentication.

In this exemplary embodiment, the first stage of the mobile authentication process is referred to as "lite" authentication registration, whereby the customer is authenticated in an expedient manner using the associated mobile handset, such that the customer is capable of registering the new online payment instruction with minimal delay. As will be explained below, authentication using this first "lite" stage involves less technical processing by the online banking system 7 to carry out an initial verification of the customer making the request. At the same time, the financial institution may be provided with a lesser degree of security with this more efficient authentication process. Consequently, the customer is initially subject to restrictions on new online payment transactions made until the second stage of the mobile authentication process is completed, referred to as "full" authentication registration.

Accordingly, at step S2-9 the mobile handset 5 downloads and installs the authentication application 15, for example from a mobile application store accessible via the data network 9. Such mobile software download and installation functionality is of a type that is known per se in mobile handset operating systems and need not be described further. The installed authentication application 15 prompts the user to begin lite authentication registration and at step S2-11, the mobile handset 5 receives user input of details identifying the customer's account and transmits the input details to the online banking server 7. The authentication application 15 may also prompt the customer to set up a personal passcode for the application, to prevent unauthorized access to the application. At step S2-13, authentication registration module 17 in the online banking server 7 retrieves the customer's mobile device number (MDN) associated with the received customer account details, from the customer database 19. At step S2-15, the authentication registration module 17 generates and transmits a unique lite registration code to the mobile handset 5, for example as an SMS to the retrieved MDN via the cellular network communication path 25. The authentication registration module 17 stores a copy of the lite registration code for subsequent verification. The generated registration code may take any respective form, and may be composed of numeric or alphabetic symbols, non-alphanumeric symbols, or a combination of such symbols.

At step S2-17, the authentication application 15 prompts the customer to input the lite registration code, as received by the mobile handset 5 in the SMS. At step S2-19, the user input lite registration code is received by the authentication registration module 17 and compared to the stored copy for a match, thereby verifying that the customer is in possession of his or her mobile handset 5. Consequently, the authentication registration module 17 activates the customer for mobile authentication by updating the customer's authentication data 23 in the customer database 19. In particular, the authentication data 23 includes data indicating that the customer is registered for mobile authentication and data indicating that online payment transactions are restricted to a predefined maximum value. The authentication data 23 may also include data indicating that additional restrictions on online banking functions, such as a maximum frequency of online payment transactions that can be made to a particular third party within a predefined time window.

After lite authentication registration for the customer is completed at step S2-21, the authentication application 15 may prompt the customer to return to the online banking website to complete registration of the new payment transaction. It will be appreciated that the online banking system 7 may include a time-out feature whereby the user is automatically logged out of the online banking website after a predetermined period of inactivity. Accordingly, processing may return to step S2-1 after the customer returns to the online banking interface on the computer 3, requiring the customer to log back on to the online banking website. However, at step S2-5, the online banking server 7 now determines that the customer is registered for mobile authentication, and in this exemplary embodiment, consequently prompt the customer at step S2-23 to enter a mobile authentication one-time passcode, for example in response to an authentication challenge from the payment transaction module 18.

At step S2-25, the customer once again loads the authentication application 15 on the mobile handset 5 and if necessary, provides user input to log on to the application, such as by verification of the user-defined PIN or passcode. At step S2-27, the authentication application 15 generates a one-time passcode (OTP). The OTP is generated using known technology, and typically expires based upon the passing of a time period set at the online banking system 7. The generated OTP may take any respective form, and may be composed of numeric or alphabetic symbols, non-alpha-numeric symbols, or a combination of such symbols. The generated OTP is displayed by the authentication application 15 and at step S2-29, the customer inputs the OTP to the online banking interface on the computer 3 for transmission as a challenge response to the online banking server 7. At step S2-31, the payment transaction registration module 18 verifies the received OTP response and confirms that mobile authentication is successful. Algorithms for generating and verifying OTPs are known per se in authentication systems and need not be described further.

It will be appreciated that the additional layer of customer verification provided by steps S2-23 to S2-31 is optional, and the online banking system does not need to involve generation and verification of such a code to enable access to the online banking functionality. As a further alternative, additional customer verification after logging on to the online banking website can be provided in a more efficient manner by the mobile handset transmitting confirmation that the customer has access to the authentication application, for example after verification of successful log on to the authentication application at step S2-25.

At step S2-33, the payment transaction registration module 18 determines from the customer's authentication data 23 whether or not online payment transactions are to be restricted, as discussed above. In the present example, the customer has only completed lite authentication registration and therefore restriction on the maximum transaction value is in place. Accordingly, at step S2-35, the payment transaction registration module 18 determines if the value of the new online payment transaction is less than the predefined limit. If the value of the new online payment transaction is within the restricted limit, then at step S2-37, the new online payment transaction data 27 is stored in the customer database 19, and subsequently processed by the financial institution back-end systems in the normal manner.

On the other hand, if the payment transaction registration module 18 determines at step S2-35 that the value of new payment transaction is greater than the predefined limit that is in place for the customer's online account, then at step S2-39, the instruction is declined and the online banking interface displays the declined decision to the customer at step S2-41. The online banking interface on the computer 3 may also display instructions to the customer, advising of the next steps required to obtain a full registration code in order to complete the second stage of authentication registration.

In this embodiment, there are a number of exemplary ways in which the online banking system 7 can implement more comprehensive and secure identification and verification (ID&V) of the customer before issuing a full registration code. One way is to request a full registration code from the financial institution to be sent by post to the customer's registered postal address. Another way is to use an Automated Teller Machine (ATM) configured with software to generate a full registration code after successful validation of the customer's card and PIN. Yet another way involves physical in-branch ID&V before a member of staff at the bank branch provides a full registration code. It will be appreciated that all of these ID&V techniques involve additional processes compared to the lite authentication registration process, and thus involve additional delay to the customer and the registration process to provide for increased security to the financial institution and the customer.

After obtaining a full registration code, the customer once again loads the authentication application 15 on the mobile handset 5 and if necessary, provides user input to log on to the application. The authentication application 15 may be configured to subsequently prompt the customer for input of the full registration code to complete the second stage of the process. At step S2-43, the authentication application 15 receives user input of the full registration code for transmission to the online banking system 7. At step S2-45, the authentication registration module 17 in the online banking system 7 receives and verifies the user input full registration code. After the full registration code is verified, the authentication registration module 17 updates the customer's authentication data 23 in the customer database 19 at step S2-47, to remove the restrictions on subsequent online payment transactions. Processing then returns to step S2-1 where the customer is now able to utilise mobile authentication when registering new online payment transactions, without any restrictions being applied at step S2-33.

In embodiments described above, the computer and mobile handset are provided as separate entities associated with a customer. As those skilled in the art will appreciate, the functionality provided via the web browser of the computer may instead be provided via a web browser or online banking application of the mobile handset, and integrated with the functionality as provided by the authentication application.

Alternative Embodiments

It will be understood that embodiments of the present invention are described herein by way of example only, and that various changes and modifications may be made without departing from the scope of the invention.

For example, in the embodiment described above, the online banking system and web-based interface prompts the customer to input a one-time passcode after receiving an input instruction to set up a new online payment transaction. As an alternative, the online banking website may be configured to determine whether the customer is registered for mobile authentication at initial log-on, and to prompt the user for input of a one-time passcode challenge response instead of, or in addition to, the typical log-on details.

In the embodiment described above, the two stage registration process is described in the context of an online banking system involving a web-based interface via a customer's browser application on a computer. As those skilled in the art will appreciate, the two stage registration process is also applicable non-browser interface forms of systems for financial services. For example, a process for registering a customer for mobile banking using a software module or application on a smart phone can be adapted to include first and second registration stages, whereby authentication using the first "lite" stage involves less technical processing by the system to carry out an initial verification of the customer making the request. In this alternative embodiment, the system can be adapted to restrict predetermined functionality of the mobile banking application to certain predetermined online banking functions, such as retrieval of account balances. However, other predetermined online banking functions can be disabled or otherwise made unavailable to the user, such as the ability to issue new payment transaction instructions, until the second "full" stage of the mobile authentication process is completed. Once the user obtains the full registration code, as described in the embodiment above, the full registration code can be entered to the mobile application to enable unrestricted access to all of the application functions.

As another example, the two stage registration process may be applicable to registration for a software module or application on a mobile handset for a service that is provided solely to registered users, such as a discount members-only club that uses a mobile application. Similar to the example alternative embodiment described above, the two stage application registration process enables a restricted service to be provided initially by the mobile application to the users registered using the first "lite" stage, and subsequently to provide unrestricted access to all functions of the mobile application after completion of the second "full" stage of registration.

In the main embodiment described above, examples of initial restrictions placed on online payment transactions after the first "lite" stage of registration are limits placed on the value of an online transaction and/or the number of times an online transaction can be made to a particular third party within a predefined time window. As those skilled in the art will appreciate, other controls that can be applied in addition or instead of the above restrictions, for example enhanced activity monitoring, increased outbound alerts to registered customer contact data, etc.

In the embodiment described above, the online banking system includes a plurality of modules, which may be implemented as hardware modules or computer programs or software in memory, which when executed, enable the system to implement embodiments of the present invention as discussed herein. As those skilled in the art will appreciate, the software may be stored in a computer program product 101 and loaded into the online banking system using any known instrument, such as removable storage disk or drive, hard disk drive, or communication interface, to provide some examples. Additionally, although the web server is illustrated as a single component within the online banking system for clarity, it will be appreciated that the web server may be implemented as a plurality of distributed components, whereby highly secured access to the critical customer database and modules of the online banking system can be provided by the distributed web server.

Alternative embodiments may be envisaged, which nevertheless fall within the scope of the following claims.

The invention claimed is:

1. A method of registering online transaction details in an financial transaction system, the method comprising:
receiving data associated with an online transaction from a user, and storing data defining the online transaction after verifying the user's identity;
wherein in an initial mode of operation, the online transaction is checked for conformance with a predefined restriction, and in a subsequent mode of operation, the predefined restriction is removed;
wherein verifying the user's identity comprises receiving data identifying a passcode generated using a passcode generator module on a mobile device and verifying the received passcode;
the method further comprising registering the user for mobile identity verification using the passcode generator module on the mobile device by:
verifying a first registration code entered by the user to the mobile device, and
storing data indicative of said initial mode of operation; and
verifying a second registration code entered by the user to the mobile device,
and storing data indicative of said subsequent mode of operation.

2. The method of claim 1, wherein the predefined restriction is a maximum value of the online transaction from the user.

3. The method of claim 1, wherein the predefined restriction is a total number of online transactions from the user to a third party within a time period.

4. The method of claim 1, wherein the passcode comprises numeric or alphabetic symbols, non-alphanumeric symbols, or a combination of such symbols.

5. The method of claim 1, wherein the received data associated with the online transaction includes a transaction value.

6. The method of claim 5, wherein the received data associated with the online transaction further includes data identifying a third party payee.

7. The method of claim 1, further comprising, in the initial mode of operation, performing enhanced activity monitoring and transmitting a greater number of outbound alerts to said user, compared to the subsequent mode of operation.

8. The method of claim 1, wherein the first registration code is transmitted to the user via a first communication channel, and wherein the second registration code is transmitted to the user via a second communication channel different to the first communication channel.

9. The method of claim 8, wherein the first registration code is transmitted to the mobile device as an SMS message.

10. The method of claim 1, wherein the registration code comprises numeric or alphabetic symbols, non-alphanumeric symbols, or a combination of such symbols.

11. A system comprising one or more computer processors configured to:
receive data associated with an online transaction from a user, and store data defining the online transaction after verifying the user's identity;
wherein the one or more computer processors are configured, in an initial mode of operation, to check the online transaction for conformance with a predefined restriction, and wherein in a subsequent mode of operation, the predefined restriction is removed;
wherein the one or more computer processors are configured to verify the user's identity by receiving data identifying a passcode generated using a passcode generator module on a mobile device and verifying the received passcode;
register the user for mobile identity verification using the passcode generator module on the mobile device by:

verifying a first registration code entered by the user to the mobile device, and storing data indicative of said initial mode of operation; and verifying a second registration code entered by the user to the mobile device, and storing data indicative of said subsequent mode of operation.

12. A storage medium comprising machine readable instructions stored thereon for causing a computer system to perform a method comprising:

receiving data associated with an online transaction from a user, and storing data defining the online transaction after verifying the user's identity;

wherein in an initial mode of operation, the online transaction is checked for conformance with a predefined restriction, and in a subsequent mode of operation, the predefined restriction is removed;

wherein verifying the user's identity comprises receiving data identifying a passcode generated using a passcode generator module on a mobile device and verifying the received passcode;

the method further comprising registering the user for mobile identity verification using the passcode generator module on the mobile device by:

verifying a first registration code entered by the user to the mobile device, and storing data indicative of said initial mode of operation; and verifying a second registration code entered by the user to the mobile device, and storing data indicative of said subsequent mode of operation.

13. A method for controlling access to application functions of a mobile application on a mobile device, the application functions configured to communicate with a server that provides services to a registered user, the method comprising the server performing the processor-implemented steps of:

in an initial registration process:

generating and transmitting a first registration code in a message to the mobile device;

receiving, from a verification application having a passcode generator module and stored on the mobile device, data identifying the registered user and the first registration code input to the verification application;

verifying the received first registration code; and in response to verifying the first registration code, configuring the mobile application to restrict functionality to predetermined application functions; and in a subsequent registration process:

receiving, from the verification application, a second registration code input to the verification application;

verifying the received second registration code; and in response to verifying the received second registration code, authorizing the mobile application to enable unrestricted access to all of the application functions.

14. The method of claim 13, further comprising:

prompting the user to input a passcode generated by the passcode generator module of the verification application on the mobile device;

receiving user input of a passcode; and verifying the input passcode.

15. The method of claim 13, wherein the first registration code is transmitted to the user via a first communication channel, and wherein the second registration code is transmitted to the user via a second communication channel different to the first communication channel.

16. The method of claim 13, wherein the first registration code is transmitted to the mobile device as an SMS message.

17. The method of claim 13, wherein the first and second registration codes comprise numeric or alphabetic symbols, non-alphanumeric symbols, or a combination of such symbols.

18. A system comprising:

means for receiving data associated with an online transaction from a user, and store data defining the online transaction after verifying the user's identity;

wherein the one or more computer processors are configured, in an initial mode of operation, to check the online transaction for conformance with a predefined restriction, and wherein in a subsequent mode of operation, the predefined restriction is removed;

wherein the one or more computer processors are configured to verify the user's identity by receiving data identifying a passcode generated using a passcode generator module on a mobile device and verifying the received passcode;

means for registering the user for mobile identity verification using the passcode generator module on the mobile device by:

verifying a first registration code entered by the user to the mobile device, and storing data indicative of said initial mode of operation; and verifying a second registration code entered by the user to the mobile device, and storing data indicative of said subsequent mode of operation.

* * * * *